US006988145B2

(12) United States Patent
Fruchtman et al.

(10) Patent No.: US 6,988,145 B2
(45) Date of Patent: Jan. 17, 2006

(54) METHOD, SYSTEM, AND PROGRAM FOR MANAGING CLIENT ACCESS TO A SHARED RESOURCE

(75) Inventors: Barry Fruchtman, Tucson, AZ (US); Michael Allen Kaczmarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 09/769,611

(22) Filed: Jan. 24, 2001

(65) Prior Publication Data

US 2002/0099843 A1 Jul. 25, 2002

(51) Int. Cl.
G06F 15/16 (2006.01)
(52) U.S. Cl. ............. 709/232; 709/224; 709/227; 709/232; 709/233; 709/229
(58) Field of Classification Search ........ 709/224–226, 709/227, 229, 223, 232, 217, 219, 233; 370/230, 370/232, 397, 229, 235; 710/200
See application file for complete search history.

(56) References Cited

U.S. PATENT DOCUMENTS

| | | | | |
|---|---|---|---|---|
| 4,604,694 | A | * | 8/1986 | Hough ................... 710/200 |
| 5,249,290 | A | * | 9/1993 | Heizer .................... 709/226 |
| 5,418,767 | A | | 5/1995 | Gaudet et al. |
| 5,583,863 | A | * | 12/1996 | Darr et al. ............... 370/397 |
| 5,774,668 | A | | 6/1998 | Choquier et al. |
| 5,913,041 | A | | 6/1999 | Ramanathan et al. |
| 5,950,170 | A | | 9/1999 | Pan et al. |
| 5,974,420 | A | | 10/1999 | Lehman et al. |
| 6,105,098 | A | * | 8/2000 | Ninose et al. ........... 710/200 |
| 6,230,200 | B1 | * | 5/2001 | Forecast et al. ......... 709/226 |
| 6,359,863 | B1 | * | 3/2002 | Varma et al. ............ 370/232 |
| 6,430,611 | B1 | * | 8/2002 | Kita et al. ............... 709/223 |
| 6,628,609 | B2 | * | 9/2003 | Chapman et al. ....... 370/229 |
| 6,636,482 | B2 | * | 10/2003 | Cloonan et al. ......... 370/230 |
| 6,658,512 | B1 | * | 12/2003 | Gokulrangan ........... 709/227 |
| 6,662,230 | B1 | * | 12/2003 | Eichstaedt et al. ...... 709/229 |
| 6,680,906 | B1 | * | 1/2004 | Nguyen .................. 370/229 |
| 6,738,839 | B2 | * | 5/2004 | Sinha ..................... 710/39 |
| 6,839,767 | B1 | * | 1/2005 | Davies et al. ........... 709/232 |

FOREIGN PATENT DOCUMENTS

CA 2202572 4/1997

OTHER PUBLICATIONS

L. Cherkasova et al., "Session-based admission control: a Mechanism for Improving Performance of Commercial WebSites", 1999 Seventh International Workshop on Quality of Service, conference paper, abstract.

A. Kavusturucu et al., "Expansion Method for the Throughout Analysis of Open Finite Manufacturing/Queueing Networks with N-Policy", Computers & Operations Research, vol. 26, No. 13, pp. 1267-1292, Nov. 1999 abstract.

(Continued)

*Primary Examiner*—Ario Etienne
*Assistant Examiner*—Ramy M. Osman
(74) *Attorney, Agent, or Firm*—David W. Victor; Konrad Raynes & Victor LLP

(57) ABSTRACT

Provided is a method, system, and program for managing client transactions requesting access to a shared resource. Client transactions are logged in a log file from multiple clients. A determination is made of one client transmitting data at a transmission rate less than a threshold transmission rate. Subsequent transactions from the determined client accessing the shared resource are denied to provide additional space in the log file for new transactions from additional clients requesting access to the resource.

32 Claims, 3 Drawing Sheets

OTHER PUBLICATIONS

A. Turpin et al., "Efficient Approximate Adaptive Coding", Proceedings DCC '97, Data Compression Conference, Mar. 1997, conference paper, abstract.

"Tivoli Enterprise™ Concepts, Architecture, and Services", Jun. 11, 2001, pp. 1-30.

Tivoli ADSM, "Tivoli ADSM Performance Tuning Guide", IBM ADSTAR Distributed Storage Manager, Version 3, Release 1, Jul. 16, 1998, pp. 1-66.

Declaration of Barry Fruchtman, signature date on Jan. 10, 2002, pp. 1-3.

* cited by examiner

# METHOD, SYSTEM, AND PROGRAM FOR MANAGING CLIENT ACCESS TO A SHARED RESOURCE

BACKGROUND OF THE INVENTION

1. Field of the Invention

The present invention relates to a method, system, and program for managing client access to a shared resource.

2. Description of the Related Art

A storage manager software product, such as the International Business Machines Corporation ("IBM") Tivoli Storage Manager, manages the backup and archiving of client application data at a central server. Multiple client computers may provide data to a server including the IBM Adstar Distributed Storage System (ADSM) or the Tivoli Storage Manager, to backup on a storage array, such as numerous hard disk drives or tape medium. Upon receiving the data, the storage manager product typically writes the data updates to a log file. If the system goes down, then any changes to the database can be reversed using the updates maintained in the log file to ensure that the system is consistent as of a specified point in time prior to the system failure.

After a client has transferred a certain amount of data, the storage manager then commits the client transactions to the storage device. Committed transactions can then be removed from the log file. After commitment, a client is ensured that the storage device is consistent with respect to the client as of the time of the most recent committed transaction. For instance, when a Tivoli Storage Manager client is in session with a Tivoli Storage Manager server and there is an interruption of any kind, the Tivoli Storage Manager server automatically rolls the session back to the last committed transaction.

In the current art, if there are numerous clients providing backup data to the storage manager, then the log file may become full. When the log file becomes full, the storage manager must take the server off-line to prevent any further backup operations because the log file cannot be used to store the updates for data recovery purposes in the event of a system failure.

For these reasons, there is a need in the art for managing access to network resources, such as a log file, in systems where multiple clients are competing for shared resources. Further, there is a need to manage the log file to prevent the log file from becoming full, which takes the server off-line.

SUMMARY OF THE PREFERRED EMBODIMENTS

Provided is a method, system, and program for managing client transactions requesting access to a shared resource. Client transactions are logged in a log file from multiple clients. A determination is made of one client transmitting data at a transmission rate less than a threshold transmission rate. Subsequent transactions from the determined client accessing the shared resource are denied to provide additional space in the log file for new transactions from additional clients requesting access to the resource.

In further implementations, all pending transaction of the determined client are removed from the log file.

Yet further, clients submit transactions requesting the resource during a session that the clients initiate. A determination is made of one client session active longer than a threshold time period. The determination of whether the client data transmission rate is less than the threshold transmission rate is made for the determined client whose session is active longer than the threshold time period. Subsequent transactions requesting access to the resource are denied for the client having the session active longer than the threshold period of time and having the data transmission rate less than the threshold transmission rate.

In certain implementations, an oldest pending transaction logged in the log file is capable of preventing new transactions from being added to the log file.

Yet further, the resource may comprise a storage device and the transactions may provide updates to data in the storage device.

The described implementations provide a technique for managing access to a shared resource that removes pending transactions from a log submitted by clients that are transmitting data at an unacceptably low data transmission rate. This methodology prevents clients transmitting at particularly low data transmission rates from acting as a bottleneck that prevents the submission of new transactions from clients transmitting at higher data transmission rates. In this way, the described implementations provide a technique for performance tuning at a server providing access to a shared resource by dynamically managing active clients and, in particular, removing transactions from those clients transmitting at relatively slow data transmission rates.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
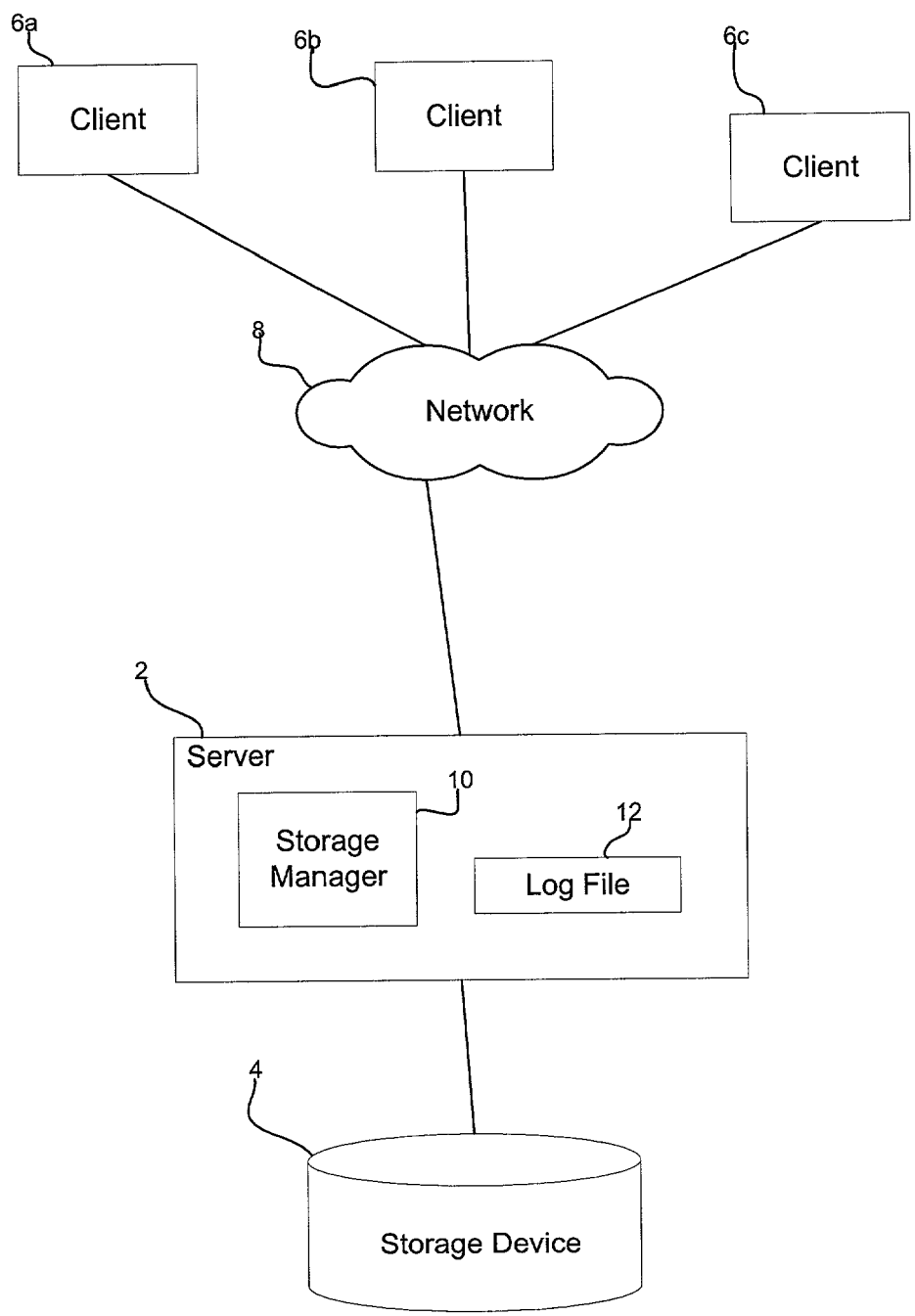
FIG. 1 is a block diagram illustrates a network storage environment implementation of the present invention.

FIG. 1 illustrates a network storage system implementation of the invention. A server 2 controls input/output (I/O) access to a storage device 4, such as an array of hard disk drives (e.g., Direct Access Storage Device (DASD), Just a Bunch of Disks (JBOD), Redundant Array of Inexpensive Disk (RAID) array, etc.), a tape subsystem, optical storage system, etc. Numerous clients 6a, b, c communicate with the server 2 over network 8. The server 2 may comprise any server class machine or other computer system capable of managing access to a storage device. The clients 6a, b, c may comprise any computer device known in the art, such as a server, mainframe, desktop computer, network client, laptop, etc. The network 8 may comprise any network system known in the art, such as a Local Area Network (LAN), Storage Area Network (SAN), Intranet, the Internet, etc., using any communication protocol known in the art, e.g., the Transmission Control Protocol/Internet Protocol (TCP/IP), Fibre Channel, Small Computer System Interface (SCSI), etc.

In certain implementations, the server 2 includes a storage manager 10 program to manage I/O requests from the multiple clients 6a, b, c. The clients may include a client backup application program to backup data at the storage device 4 through the server 2. In the described implementations, the storage manager 10 maintains a log file 12 of update transactions received from the clients 6a, b, c. After a client has transferred a predetermined number of transaction bytes or a predetermined number of files, the update transactions for that client 6a, b, c are applied to the storage device 4 and then marked as committed in the log file 12. Committed transactions are removed from the log file 12 to free log file space 12.

Figure 2:
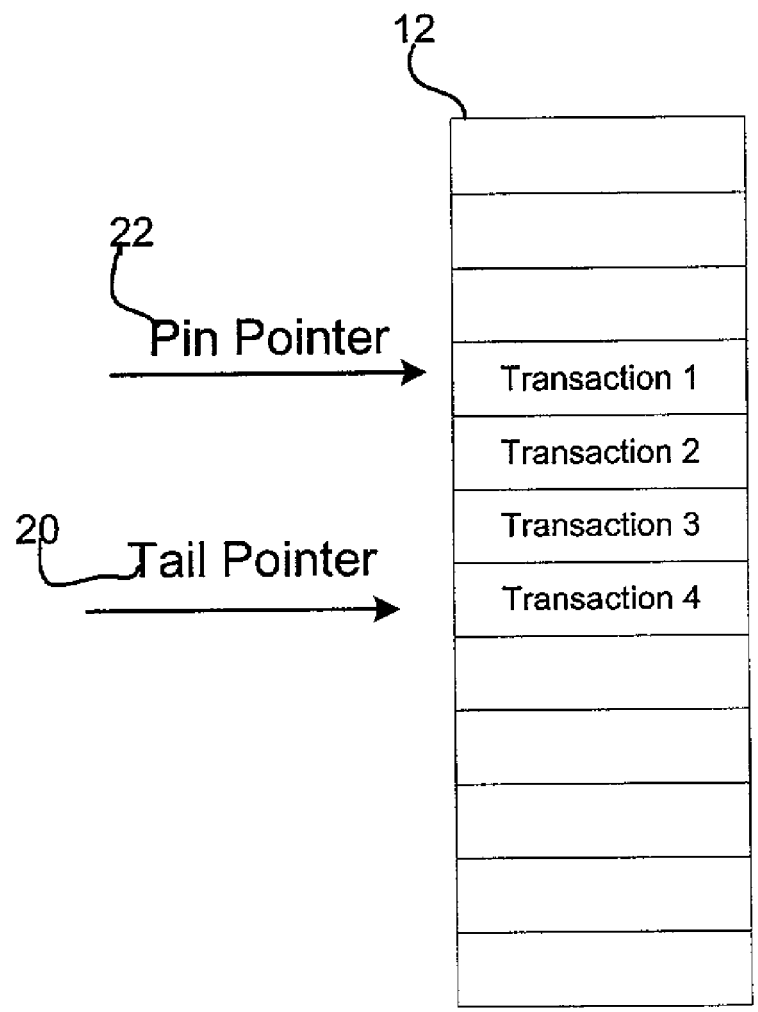
FIG. 2 illustrates an implementation of a log file used to store transactions providing updates to the storage device.

FIG. 2 illustrates an implementation of how the log file 12 stores transactions in the log file 12 in a manner known in the art. In FIG. 2, the log file 12 is comprised of sequential blocks of data, such as sequential fixed block addresses (FBA). The storage manager 4 maintains a tail pointer 20 and pin pointer 22 to point to block addresses in the log file 12 including client transactions. The tail pointer 20 points to the most recent added transaction, which in FIG. 2 is transaction 4. A new transaction is added to the block immediately following the tail pointer 20 and the tail pointer 20 is then moved downward to point to the next block address including the added transaction. The pin pointer 22 points to the oldest transaction in the log file 12. If the tail pointer 20 reaches the last block address in the log file 12, then the tail pointer wraps around to the first block address in the log file 12. After wrapping around, the tail pointer 12 would continue to move downward from the first block address as transactions are added. However, the tail pointer 20 cannot move past the pin pointer 22. The log file 12 is full and unable to accept further update transactions if the tail pointer 20 is at a block address adjacent to the block address pointed to by the pin pointer 22. When the transaction addressed by the pin pointer 22 is committed, the pin pointer 22 is moved downward to the next oldest transaction maintained in the log file 12.

With the log file 12 arrangement illustrated in FIG. 2, a client 6a, b, c transmitting backup updates at a relatively slow data transmission rate may not transmit enough data to trigger a commit operation. In fact, the pin pointer 22 may point to the oldest transaction from the client 6a, b, c transmitting data for a long time at a particularly slow rate without triggering the commit procedure. In such case, the pin pointer 22 may become a bottleneck that prevents clients 6a, b, c transmitting backup updates at particularly high data transmission rates from providing their updates because new update transactions cannot be added beyond the pin pointer 22 addressing the old pending transaction from the slow client 6a, b, c. Moreover, even if transactions between the tail 20 and pin 22 pointers are committed and removed from the log file 12, such free space cannot be used until the transaction addressed by the pin pointer 22 is committed. Upon commitment, the pin pointer 22 may advance beyond the free space to make such space available to new transactions.

The described implementations provide a methodology to manage existing client 6a, b, c sessions to prevent bottlenecks resulting from clients 6a, b, c transmitting at particularly slow transmission rates. A client 6a, b, c may transmit at a relatively slow rate if it uses a slower interface adaptor, e.g., a telephone modem, when other clients are using fast connections, e.g., optical networks. Clients 6a, b, c that are overloaded may also transmit data at slow rates.

Figure 3:
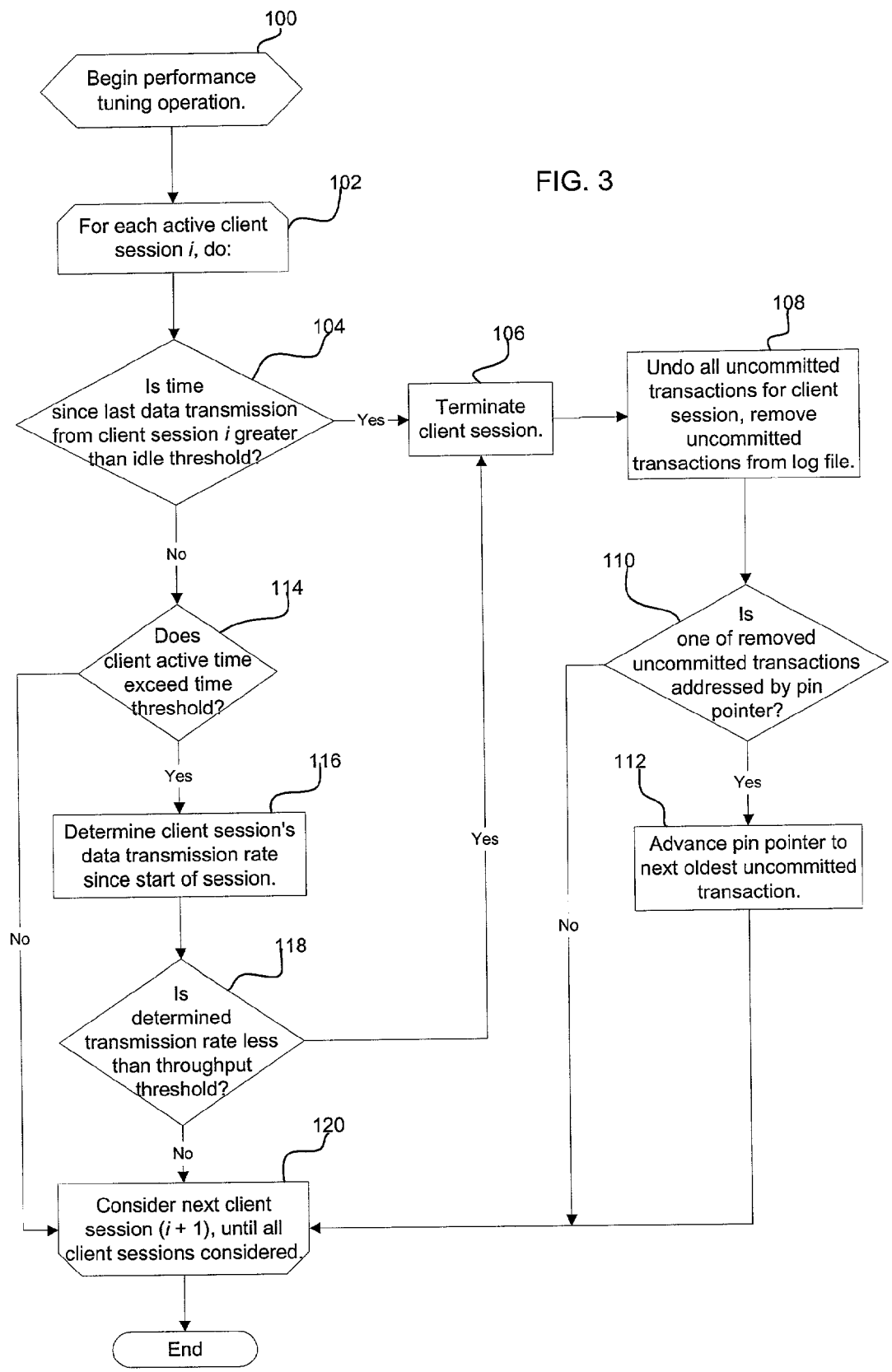
FIG. 3 illustrates logic implemented in a storage manager to manage client access to the shared resource through the log file in a manner that improves system performance.

FIG. 3 illustrates logic implemented in the storage manager 4 to manage client 6a, b, c sessions to prevent sessions from becoming bottlenecks for the other managed sessions. In the implementation of FIG. 3, the storage manager 4 considers a time threshold and throughput threshold to determine whether to terminate a client session. Control begins at block 100 with the storage manager 4 initiating a performance tuning operation, that may be initiated at periodic intervals. The storage manager 4 performs the loop at block 102 through for each client 6a, b, c session i. The storage manager 4 may consider client sessions in the order of the time they have been active, or any other parameters. If (at block 104) the time client session i has been idle, i.e., not transmitted data, exceeds the idle threshold, then the storage manager 4 terminates (at block 106) that idle client session i. The storage manager 4 further reverses (at block 108) any uncommitted updates partially applied to the storage device 4 and removes the uncommitted update transactions from the log file 12. In certain implementations, whenever reversing or removing uncommitted update transactions from the log file 12, the storage manager 4 "rolls back" or removes the updated data maintained in the reversed or aborted transaction from the storage device 4 so that the data in the storage device 4 remains consistent. For instance, updates from uncommitted transactions can be reversed from the storage device 4 to make the data in the storage device 4 consistent as of the time of the last committed update.

If (at block 110) one of the uncommitted transactions removed from the log file 12 was addressed by the pin pointer 22, then the storage manager 4 advances (at block 112) the pin pointer 22 to the next oldest uncommitted transaction in the log file 12. If the pin pointer 22 did not address one of the removed uncommitted transactions (from block 110) or after advancing the pin pointer 22 (at block 112), control proceeds to block 120 to consider the next (i+1)th client 6a, b, c session until all client 6a, b, c sessions are considered.

If (at block 104) the client session i does not exceed the idle threshold, then the storage manager 4 determines (at block 114) whether client session i has been active for a time exceeding the time threshold, e.g., a few hours or any predetermined time. If so, the storage manager 4 determines (at block 116) the data throughput rate of client session i. In certain implementations, the storage manager 4 may calculate the data throughput rate as the number of bytes transferred since the start of the client 6a, b, c session divided by the time the client session 6a, b, c has been active. Alternative techniques may be used to calculate the throughput, such as consideration of the throughput of only more recent data transmissions. If (at block 118) the determined throughput is less than the throughput threshold, then control proceeds to block 106 to terminate client session i and advance the pin pointer 22 if the oldest uncommitted transaction was from client session i. Otherwise, if the throughput threshold is exceeded, then control proceeds (at block 120) to consider the next client session i.

The time, throughput, and idle thresholds used in the logic of FIG. 3 may be determined based on empirical tests of the storage network system to determine an optimal selection of threshold values. Additionally, the time, throughput, and idle thresholds may be adjusted using line commands from the server 2 or from a client 6a, b, c over the network 8.

The performance tuning methodology of FIG. 3 provides for dynamic management of active client sessions to determine whether to terminate a session to free log file resources. The methodology of FIG. 3 tends to terminate those client sessions creating a bottleneck at the pin pointer 22 because client sessions that have been active for a relatively long period of time and that have low data transmission rates are likely to have the oldest uncommitted transactions. Terminating those client 6a, b, c sessions that are most likely to have the oldest uncommitted transactions would advance the pin pointer 22 to make room for more update transactions, in addition to freeing log file 12 space. In this way, a client session with a slow throughput will not prevent client sessions having relatively high throughput rates from continuing operations at the high throughput rate.

The above methodology is particularly advantageous if the storage network has numerous clients transmitting data at significantly different rates. Moreover, if one client is overloaded or having errors, yet still transmitting update transactions, then the methodology of FIG. 3 prevents the problematic client session from affecting all active client sessions.

In the implementation of FIG. 3, a client satisfying the thresholds is terminated. In alternative implementations, those clients satisfying the thresholds may be directed toward another server instead of being terminated. For instance, one server can be dedicated to clients 6a, b, c transmitting at relatively slow rates so that clients 6a, b, c having higher throughput can use the same server and not have their performance adversely affected by slower clients 6a, b, c.

Providing an alternative server for slower data transmissions would be particularly useful for Internet commerce web sites. Those clients accessing the Internet commerce web site at slow transmission rates would access the same server so that clients transmitting at relatively faster rates can use the "fast" server and not be limited by clients with slower throughput.

The following describes some alternative implementations.

The preferred embodiments may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations provided a technique for managing access to a storage device. Additionally, the above described logic may be used to manage client access to any type of shared resource, such as any type of input/output (I/O) device (e.g., printer, scanner, etc.), network adaptors, controllers, etc.

In the described implementations, the log file 12 stored transaction updates in a circular buffer. In alternative implementations, different queuing techniques may be used to store updates in the log file 12.

In the logic of FIG. 3, a client session was deemed too slow if it has been active a relatively long time, i.e., exceeding the time threshold, and has a relatively low throughput rate, i.e., less than the throughput threshold. Additional or different performance parameters may be considered to determine if a client session is transmitting data at a sufficiently slow rate that increases the likelihood that the client session is a bottleneck to faster client sessions.

The preferred logic of FIG. 3 described specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing client transactions requesting access to a shared storage device, comprising:

logging client transactions providing updates to data in the shared storage device in a log file from multiple clients, wherein an oldest pending transaction logged in the log file is capable of preventing new transactions from being added to the log file, and wherein the clients submit transaction to the shared storage device during a session that the clients initiate;

determining one of the clients whose session is active longer than a threshold time period and that is also transmitting data at a transmission rate less than a threshold transmission rate; and denying subsequent transactions from the determined client access to the shared storage device to provide additional space in the file for new transactions from the clients, other than the determined client, requesting access to the shared storage device.

2. The method of claim 1, further comprising:

determining one pending transaction whose access to the shared storage device has completed; and removing the determined pending transaction from the log file.

3. The method of claim 2, further comprising:

determining one client that has transmitted a threshold amount of data, wherein the determination and removal from the log file of pending transactions whose access to the share storage device has completed is made for all the pending transactions of the determined client that has transmitted the threshold amount of data.

4. The method of claim 1, further comprising:

providing a first pointer pointing to an oldest pending transaction in the log file that is capable of preventing new transactions from being added to the log file; and if one of the removed transactions is the oldest pending transaction in the log file, then adjusting the first pointer to point to the next oldest pending transaction in the log file, wherein adjusting the first pointer frees space in the log file for new transactions to be added.

5. The method of claim 4, further comprising:

providing a second pointer pointing to a most recently added transaction to the log file; and adding a new transaction to the log file by writing information on the new transaction to an address in the log file following the second pointer and adjusting the second pointer to point to the address of the added new transaction, wherein one new transaction cannot be added to the log file if the first pointer addresses a first location in the log file adjacent to a second location addressed by the second pointer. file is capable of preventing new transactions from being added to the log file.

6. The method of claim 5, wherein new transactions are added to sequential addresses in the log file, further comprising:

if the second pointer is at the last address in the log file, then writing information on the new transaction to the first address in the log file and adjusting the second pointer to point to the first address in the log file.

7. The method of claim 1, wherein access to the shared storage device is provided through a server, wherein the server maintains the log file.

8. The method of claim 7, further comprising:

redirecting transactions from the determined client to an additional server providing access to another copy of the shared storage device requested by the client transactions.

9. The method of claim 1, wherein the update transactions are provided by a client backup program to backup client data in the storage device.

10. A method for managing client transaction requesting access to a shared storage device, comprising:

logging client transactions providing updates to data in the shared storage device in a log file from multiple clients;

determining one of the clients transmitting data at a transmission rate less than a threshold transmission rate;

denying subsequent transactions from the determined client access to the shared storage device to provide additional space in the log file for new transaction from the clients, other than the determined client, requesting access to the shared storage device; and removing all pending transactions of the determined client from the log file.

11. The system of claim 2, wherein an oldest pending transaction logged in the log file is capable of preventing new transactions from being added to the log file.

12. A system for managing client transactions from multiple clients, comprising:

a shared storage device, wherein the client transactions request access to the shared storage device to provide updates to data in the shared storage device;

a computer readable medium including a log file;

means for logging client transactions in the log file from multiple clients, wherein an oldest pending transaction logged in the log file is capable of preventing new transactions from being added to the log file, and wherein the clients submit transactions to the shard storage device during a session that the clients initiate;

means for determining one client whose session is active longer than a threshold time period and that is also transmitting data at a transmission rate less than a threshold transmission rate; and means for denying subsequent transactions from the determined client access to the shared storage device to provide additional space in the log file for new transactions from the clients, other than the determined client, requesting access to the resource.

13. The system of claim 12, further comprising:

means for determining one pending transaction whose access to the shared storage device has completed; and means for removing the determined pending transaction from the log file.

14. The system of claim 13, further comprising:

means for determining one client that has transmitted a threshold amount of data, wherein the determination and removal from the log file of pending transactions whose access to the shared storage device has completed is made for all the pending transactions of the determined client that has transmitted the threshold amount of data.

15. The system of claim 12, further comprising:

means for providing a first pointer pointing to an oldest pending transaction in the log file that is capable of preventing new transactions from being added to the log file; and means for adjusting the first pointer to point to the next oldest pending transaction in the log file if one of the removed transactions is the oldest pending transaction in the log file, wherein adjusting the first pointer frees space in the log file for new transactions to be added.

16. The system of claim 15, further comprising:

means for providing a second pointer pointing to a most recently added transaction to the log file; and means for adding a new transaction to the log file by writing information on the new transaction to an address in the log file following the second pointer and adjusting the second pointer to point to the address of the added new transaction, wherein one new transaction cannot be added to the log file if the first pointer addresses a first location in the log file adjacent to a second location addressed by the second pointer.

17. The system of claim 16, wherein new transactions are added to sequential addresses in the log file, further comprising:

means for writing information on the new transaction to the first address in the log file and adjusting the second pointer to point to the first address in the log file if the second pointer is at the last address in the log file.

18. The system of claim 12, further comprising:

a server providing access to the shared storage device, wherein the server includes the computer readable medium including the log file.

19. The system of claim 18, further comprising:

an additional server providing access to an additional copy of the shared storage device; and means for redirecting transactions from the determined client to the additional server to provide the redirected transaction access to the shared storage device.

20. The system of claim 12, further comprising:

a client backup program, wherein the update transactions are provide by the client backup program to backup client data in the shared storage device.

21. The system for managing client transactions from multiple clients, comprising:
  a shared storage device, wherein the client transactions request access to the shared storage device to provide updates to data in the shared storage device;
  a computer readable medium including a log file;
  means for logging client transactions in the log file from the multiple clients;
  means for determining one client transmitting data at a transmitting data at a transmission rate less than a threshold transmission rate;
  means for denying subsequent transactions from the determined client access to the shared storage device to provide additional space in the log file for new transactions from the clients, other than the determined client, requesting access to the shared storage device; and
  means for removing all pending transaction of the determined client from the log file.

22. An article of manufacture for managing client transactions from multiple clients requesting access to a shared device in a log file, the article of manufacture comprising a storage medium storing code capable of causing a processor to perform:
  logging client transactions in the log file from the multiple clients, wherein an oldest pending transaction logged in the log file is capable of preventing new transactions from being added to the log file, and wherein the clients submit transactions requesting the shared storage device during a session that the clients initiate;
  determining one client whose session is active longer than a threshold time period and that is also transmitting data at a transmission rate less than a threshold transmission rate; and
  denying subsequent transactions from the determined client access to the shared storage device to provide additional space in the log file for new transactions from additional clients, other than the determined client, requesting access to the shared storage device.

23. The article of manufacture of claim 22, wherein the code is further capable of causing the processor to perform:
  determining one pending transaction whose access to the shared storage device has completed; and
  removing the determining pending transaction from the log file.

24. The article of manufacture of claim 23, wherein the code is further capable of causing the processor to perform:
  determining one client that has transmitted a threshold amount of data, wherein the determination and removal from the log file of pending transaction whose access to the shared storage device has completed is made for all the pending transaction of the determined client that has transmitted the threshold amount of data.

25. The article of manufacture of claim 22, wherein the code is further capable of causing the processor to perform:
  providing a first pointer pointing to an oldest pending transaction in the log file that is capable of preventing new transactions from being added to the log file; and
  if one of the removed transactions is the oldest pending transaction in the log file, then adjusting the first pointer to point to the next oldest pending transaction in the log file, wherein adjusting the first pointer frees space in the log file for new transactions to be added.

26. The article of manufacture of claim 25, wherein the code is further capable of causing the processor to perform:
  providing a second pointer pointing to a most recently added transaction to the log file; and
  adding a new transaction to the log file by writing information on the new transaction to an address in the log file following the second pointer and adjusting the second pointer to point to the address of the added new transaction, wherein one new transaction cannot be added to the log file if the first pointer addresses a location in the log file adjacent to the location addressed by the second pointer.

27. The article of manufacture of claim 26, wherein new transactions are added to sequential addresses in the log file, and wherein the code is further capable of causing the processor to perform:
  if the second pointer is at the last address in the log file, then writing information on the new transaction to the first address in the log file and adjusting the second pointer to point to the first address in the log file.

28. The article of manufacture of claim 22, wherein access to the shared storage device is provided through a server, wherein the server maintains the log file.

29. The article of manufacture of claim 28, wherein the code is further capable of causing the processor to perform:
  redirecting transactions from the determined client to an additional server providing access to another copy of the resource requested by the client transactions.

30. The article of manufacture of claim 22, wherein the update transactions are provided by a client backup program to backup client data in the shared storage device.

31. An article of manufacture for managing client transactions from multiple clients requesting access to a shared storage device in a log file, the article of manufacture comprising a storage medium storing code capable of causing a processor to perform:
  logging client transaction in the log file from the multiple clients;
  determining one client transmitting data at a transmission rate less than a threshold transmission rate;
  denying subsequent transaction from the determined client access to the shared storage device to provide additional space in the log file for new transaction from the clients, other than the determined client, requesting access to the shared storage device; and
  removing all pending transaction of the determined client from the log file.

32. The article of manufacture of claim 31, wherein an oldest of pending transaction logged in the log file is capable of preventing new has transactions from being added to the log file.

* * * * *